L. M. KUEHN.
CHEESE CUTTER.
APPLICATION FILED OCT. 10, 1908.
965,114.
Patented July 19, 1910.
2 SHEETS—SHEET 1.
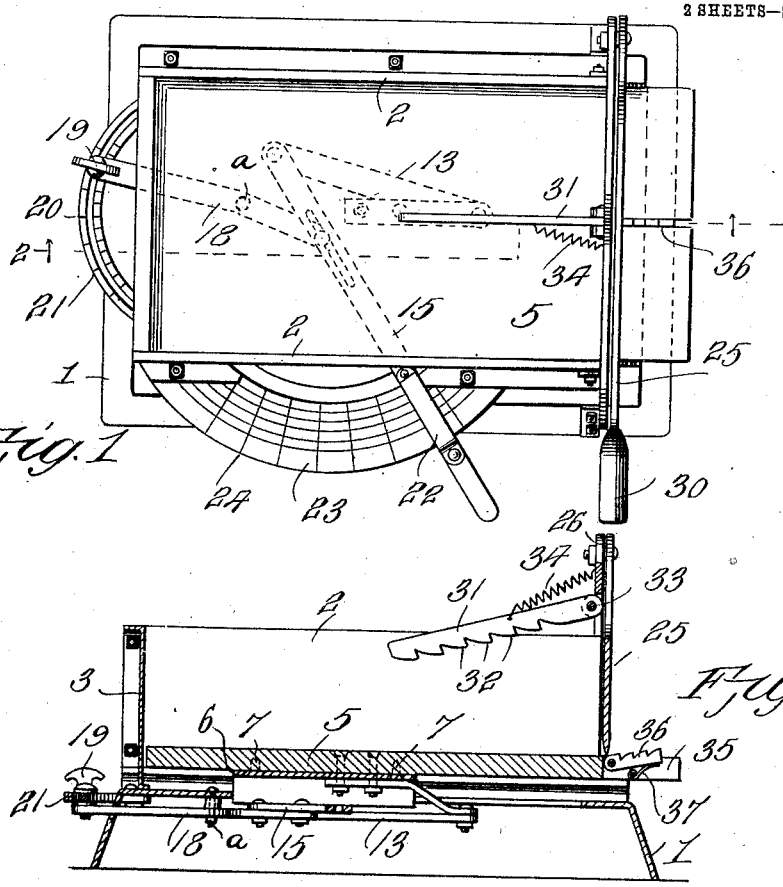
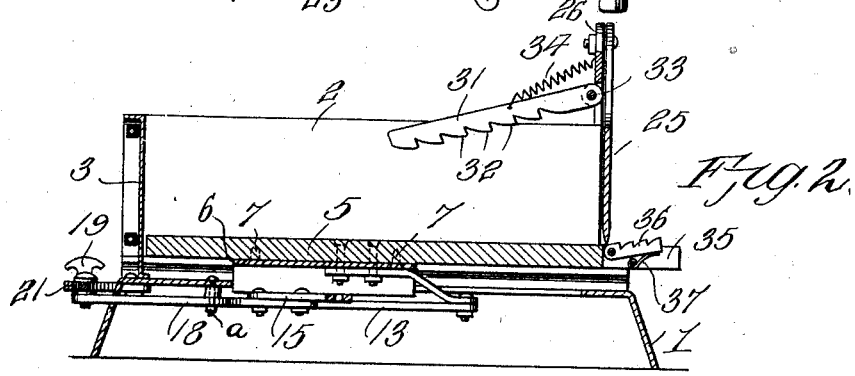
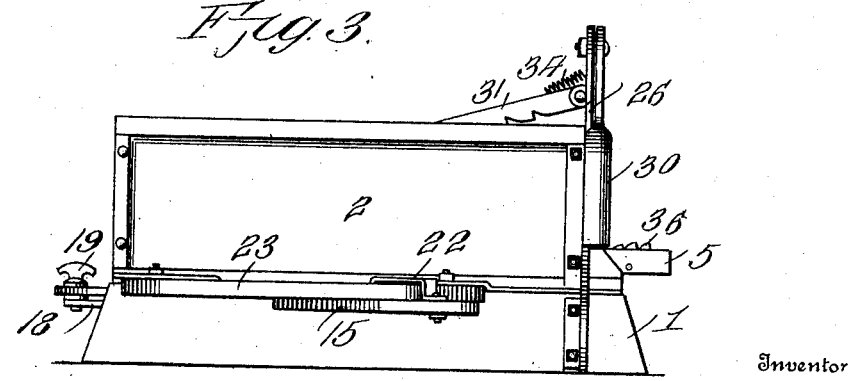
Inventor
Lucas M. Kuehn,
By Victor J. Evans
Attorney
Witnesses

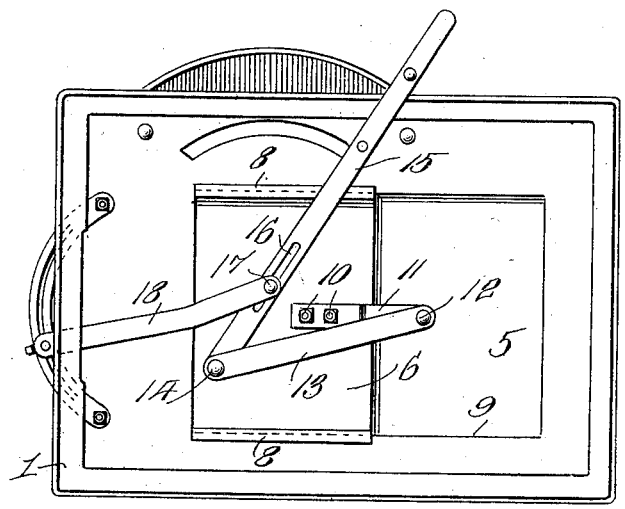

UNITED STATES PATENT OFFICE.

LUCAS M. KUEHN, OF WABASHA, MINNESOTA.

CHEESE-CUTTER.

965,114.     Specification of Letters Patent.     Patented July 19, 1910.

Application filed October 10, 1908. Serial No. 457,074.

*To all whom it may concern:*

Be it known that I, LUCAS M. KUEHN, a citizen of the United States of America, residing at Wabasha, in the county of Wabasha and State of Minnesota, have invented new and useful Improvements in Cheese-Cutters, of which the following is a specification.

This invention relates to cheese cutters, and one of the principal objects of the same is to provide a simple and efficient device for holding a cheese made in the form of a brick and for providing means for computing the weight and price per pound of the cheese and for feeding the cheese to a knife for cutting a given quantity from the brick commensurate with the price paid for such quantity.

Another object of the invention is to provide means whereby any quantity of cheese from one cent's worth to a pound may be cut from the cheese by the adjustment of a lever which controls the feed of the cheese under the cutting knife.

These and other objects may be attained by means of the construction illustrated in the accompanying drawings, in which—

Figure 1 is a top plan view of a cheese cutter made in accordance with my invention. Fig. 2 is a vertical longitudinal section on the line 2—2 of Fig. 1, looking in the direction indicated by the arrows. Fig. 3 is a side elevation of the cutter. Fig. 4 is a plan view looking at the bottom of the cutter. Fig. 5 is a vertical transverse section. Fig. 6 is a front elevation of the same.

Referring to the drawings, the numeral 1 designates a suitable base for supporting the frame consisting of the sides 2 and the end 3. The sides 2 may be formed of sheet metal and provided with inwardly bent flanges 4 forming a support for the sliding bottom. This sliding bottom 5 is preferably formed of wood to provide a cutting block for the knife. Secured to the bottom 5 is a plate 6, said plate being connected to the underside of the sliding bottom 5 by means of screws 7. The plate 6 has outwardly extending flanges 8 which bear upon the underside of the edges of an opening 9 formed in the top of the base portion of the device. Connected to the plate 6 by bolts 10 is a forwardly extending bar 11. Pivotally connected at 12 to the bar 11 is a link 13, said link being pivoted at 14 to a feed lever 15, said feed lever being provided with a slot 16 in which is mounted to slide the pivotal end 17 of a bar or lever 18 pivoted at *a*. The outer end of the lever 18 is provided with a set screw 19 which passes through a slot 20 in a scale sector 21. The outer end of the lever 15 is provided with a keeper 22 which spans a curved scale 23 provided with indicating marks 24.

The knife 25 is pivoted at one corner to a skeleton frame 26 secured to the base 1. The knife 25 is provided with a curved arm 27 provided with a slot 28 through which a stud or pin 29 projects, said stud being secured to the skeleton frame 26. The knife has a suitable handle 30 for operating the same.

The cheese in the form of a brick is placed between the sides 2 upon the sliding bottom 5, and a holding bar 31 engages the top of the cheese and is provided with suitable teeth 32 which prevent the backward movement of the cheese during the cutting operation, said cutting bar being pivoted at 33 to the skeleton frame 26 and provided with a spring 34 which holds the bar 31 in operative position. The front end of the bottom 5 is provided with a slot 35, and pivoted in the slot 35 is a holder 36 provided with teeth which engage the slice of cheese cut from the brick to prevent its backward movement, and a spring 37 bears upon the lower edge of the holder 36 to hold it into operative position.

The operation of my invention may be briefly referred to as follows: The weight of the cheese having been ascertained and the price per pound having been determined, the cheese is placed in the frame upon the sliding bottom 5. The computing lever 18 is then adjusted, and its outer end secured to the computing scale 21 by the set screw 19. The adjustment of the lever 18 changes the fulcrum point 17 of the lever 15 so that the movements of the lever 15 across the scale 23 will be such to feed and indicate the amount of cheese to be cut off for a given price. The knife 25 has not only a pivotal movement on the stud 29, but can be moved back and forth to cut the paper at the bottom of the cheese. The bar 31 owing to the peculiar formation of the teeth 32 will prevent the backward movement of the cheese, and the holder 36 will engage the slice to be cut and prevent its movement during the cutting operation.

My invention is of simple construction, can be manufactured at a low price is quick and easy to operate and will readily indicate the amount to be cut for a given price.

I claim:—

1. A cheese cutter comprising a frame, a sliding bottom mounted in the frame for supporting the cheese, a bar, an indicating sector to which said bar is adjustably secured, a feeding lever adjustably pivoted to said bar, a scale sector over which said feeding lever extends, and a pivoted knife for severing the cheese.

2. In a cheese cutter, a frame, a sliding bottom for supporting the cheese, means for moving the bottom and feeding a quantity of cheese, and a knife for severing the cheese, said knife having a pivotal and sliding movement when operated.

3. In a cheese cutter, a frame, a sliding bottom for supporting the cheese, means for feeding cheese out of the frame including means for moving said sliding bottom, means for adjusting the movements of said sliding bottom, and a pivoted and sliding knife for severing the cheese.

4. In a cheese cutter, the combination of a frame for containing the cheese, a knife mounted on the frame for cutting the cheese, means for feeding the cheese under the knife, a toothed bar for preventing the movement of the cheese during the cutting operation, and a toothed holder for preventing the slice cut from the cheese from moving during the cutting operation.

In testimony whereof I affix my signature in presence of two witnesses.

LUCAS M. KUEHN.

Witnesses:
L. WHITMORE,
H. J. PAINE.